United States Patent
Sun et al.

(10) Patent No.: US 10,015,443 B2
(45) Date of Patent: Jul. 3, 2018

(54) ADJUSTING SPATIAL CONGRUENCY IN A VIDEO CONFERENCING SYSTEM

(71) Applicant: Dolby Laboratories Licensing Corporation, San Francisco, CA (US)

(72) Inventors: Xuejing Sun, Beijing (CN); Michael Eckert, Ashfield (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/527,272

(22) PCT Filed: Nov. 18, 2015

(86) PCT No.: PCT/US2015/061424
§ 371 (c)(1),
(2) Date: May 16, 2017

(87) PCT Pub. No.: WO2016/081655
PCT Pub. Date: May 26, 2016

(65) Prior Publication Data
US 2017/0374317 A1 Dec. 28, 2017

Related U.S. Application Data

(60) Provisional application No. 62/086,235, filed on Dec. 2, 2014.

(30) Foreign Application Priority Data

Nov. 19, 2014 (CN) .......................... 2014 1 0670297

(51) Int. Cl.
*H04N 7/14* (2006.01)
*H04S 7/00* (2006.01)

(52) U.S. Cl.
CPC ............... *H04N 7/147* (2013.01); *H04S 7/30* (2013.01); *H04S 2420/01* (2013.01); *H04S 2420/11* (2013.01)

(58) Field of Classification Search
CPC ....................................................... H04N 7/14
See application file for complete search history.

(56) References Cited

U.S. PATENT DOCUMENTS 7,058,239 B2    6/2006   Singh
7,308,131 B2   12/2007   Lelescu
(Continued)

FOREIGN PATENT DOCUMENTS

EP           2352290       8/2011
WO    2014/052429    4/2014

OTHER PUBLICATIONS

De La Torre, F. et al "Learning to Track Multiple People in Omnidirectional Video" IEEE International Conference on Robotics and Automation, Apr. 18-22, 2005, pp. 4150-4155.
(Continued)

*Primary Examiner* — Olisa Anwah

(57) ABSTRACT

Example embodiments disclosed herein relate to spatial congruency adjustment. A method for adjusting spatial congruency in a video conference is disclosed. The method in unwarping a visual scene captured by a video endpoint device into at least one rectilinear scene, the video endpoint device being configured to capture the visual scene in an omnidirectional manner, detecting spatial congruency between the at least one rectilinear scene and an auditory scene captured by an audio endpoint device that is positioned in relation to the video endpoint device. The spatial congruency being a degree of alignment between the auditory scene and the at least one rectilinear scene and in response to the detected spatial congruency being below the
(Continued)

threshold, adjusting the spatial congruency. Corresponding system and computer program products are also disclosed.

19 Claims, 5 Drawing Sheets

(56) References Cited

U.S. PATENT DOCUMENTS

| | | | |
|---|---|---|---|
| 7,349,005 | B2 | 3/2008 | Rui |
| 8,103,006 | B2 | 1/2012 | McGrath |
| 8,471,892 | B2 | 6/2013 | Geng |
| 8,599,266 | B2 | 12/2013 | Huang |
| 8,736,680 | B1 | 5/2014 | Cilia |
| 2002/0191071 | A1* | 12/2002 | Rui .................. H04N 7/142 348/14.03 |
| 2005/0008169 | A1 | 1/2005 | Muren |
| 2008/0077953 | A1 | 3/2008 | Fernandez |
| 2008/0246759 | A1 | 10/2008 | Summers |
| 2011/0164108 | A1 | 7/2011 | Bates |
| 2012/0098927 | A1 | 4/2012 | Sablak |
| 2013/0141547 | A1 | 6/2013 | Shimizu |
| 2013/0194305 | A1 | 8/2013 | Kakuta |
| 2014/0111608 | A1 | 4/2014 | Pfeil |

OTHER PUBLICATIONS

Rui, Y. et al "Viewing Meetings Captured by an Omni-Directional Camera" Proceedings on Human Factors in Computing Systems, pp. 450-457, 2001.

Cheng, E. et al "Spatialized Teleconferencing: Recording and "Squeezed" Rendering of Multiple Distributed Sites", in Australian Telecommunication Networks and Applications Conference, 2008, pp. 411-416.

Uyttendaele M. et al., "Image-based interactive exploration of real-world environments", Computer Graphics and Applications, IEEE, vol. 24, Issue 3, May-Jun. 2004.

* cited by examiner

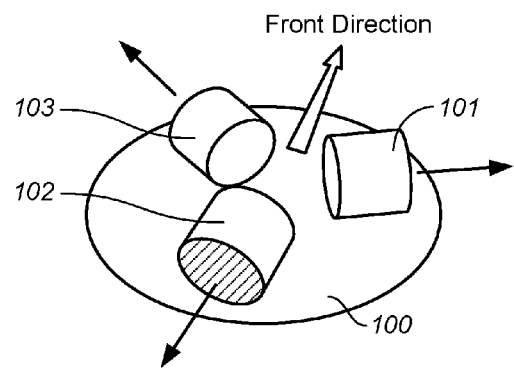
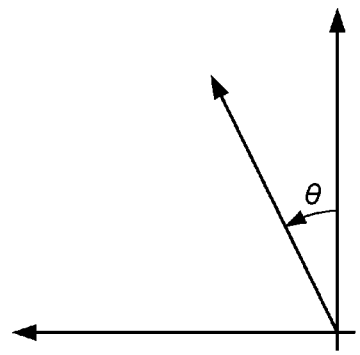
FIG. 1  FIG. 2
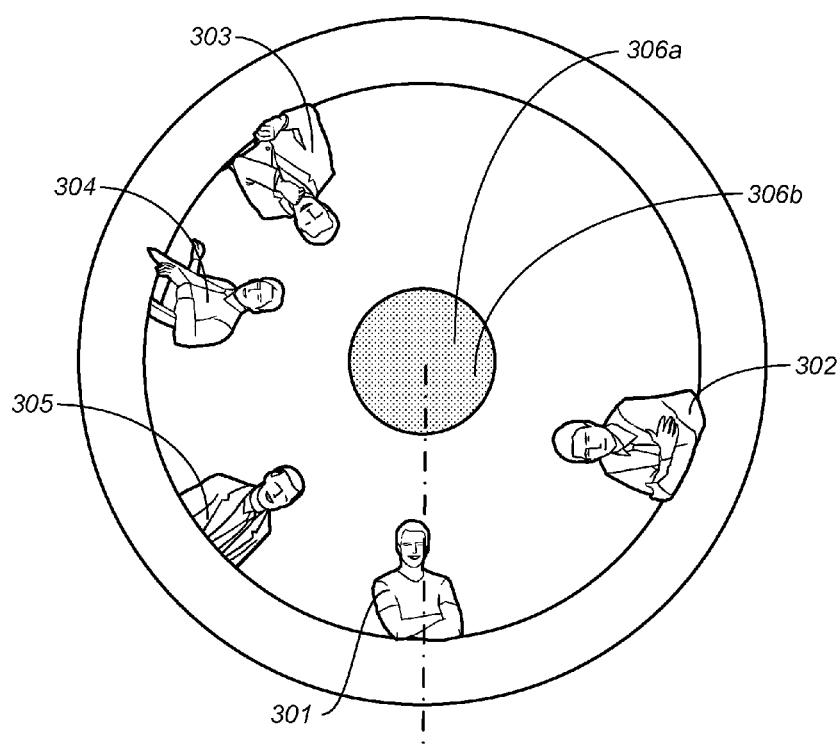
FIG. 3

ADJUSTING SPATIAL CONGRUENCY IN A VIDEO CONFERENCING SYSTEM

CROSS REFERENCE TO RELATED APPLICATIONS

This application claims priority to Chinese Patent Application No. 201410670297.2 filed on 19 Nov. 2014 and U.S. Provisional Patent Application No. 62/086,235 filed on 2 Dec. 2014, both hereby incorporated in their entirety by reference.

TECHNOLOGY

Example embodiments disclosed herein generally relate to audio content processing, and more specifically to a method and system for adjusting spatial congruency, especially in a video conferencing system.

BACKGROUND

When conducting a video conference visual signals are generated and transmitted from one end of the call to the other end(s) along with auditory signals, so that when one or more conference participants are speaking, the sound produced on the other end(s) should be synchronized and played simultaneously. There are two kinds of discrepancies which may exist in a video conference between the audio and video: discrepancies in time and spatial congruency. Discrepancies in time between audio and video streams lead to synchronization problems, for example the vocal utterances (e.g., voices) from the speaking participants may not be synchronized with each participant's mouths. Spatial congruency, on the other hand describes how much the sound field being played matches the visual scene being displayed. Alternatively, spatial congruency may define a degree of alignment between an auditory scene and a visual scene. The example embodiments described herein aim to adjust spatial congruency in a video conference so that the auditory scene and the visual scene are matched with each other, thereby presenting an immersive video conferencing experience for the participants on multiple ends.

Users need not be concerned about the above described spatial congruency problem if the audio signal is in mono format which is commonly adopted in most of existing video conferencing systems. However, if at least two channels are employed (e.g., stereo) spatial congruency may occur. Nowadays, sound can be captured by more than two microphones, which would be transmitted in a multi-channel format, such as 5.1 or 7.1 surround formats, and rendered and played by multiple transducers by the end user(s). In a typical conference environment, there are several participants surrounding a device for capturing their voices and each of the participants can be seen as a single audio object which generates a series of audio signals upon speaking.

As used herein, the term "audio object" refers to an individual audio element that exists for a defined duration in time in the sound field. An audio object may be dynamic or static. For example, a participant may walk around the audio capture device and the position of the corresponding audio object varies accordingly.

For video conferences and various other applications involving spatial congruency issues, incongruent auditory-visual rendition leads to an unnatural percept which could cause a degraded conferencing experience. In general, a discrepancy less than 5° can be seen as acceptable because such a difference in the angle is not significantly noticeable to most users. If the discrepancy in the angle is more than 20°, most users find it to be noticeably unpleasant.

In view of the foregoing, there is a need in the art for a solution for adjusting the auditory scene to be aligned with the visual scene or adjusting the visual scene to be aligned with the auditory scene.

SUMMARY

In order to address the foregoing and other potential problems, the example embodiments disclosed herein proposes a method and a system for adjusting spatial congruency in a video conference.

In one aspect, the example embodiments disclosed herein provide a method for adjusting spatial congruency in a video conference. The method includes such steps as unwarping a visual scene captured by a video endpoint device into at least one rectilinear scene. The video endpoint device being configured to capture the visual scene in an omnidirectional manner. Additional steps include detecting spatial congruency between the at least one rectilinear scene and an auditory scene captured by an audio endpoint device that is positioned in relation to the video endpoint device. The spatial congruency being a degree of alignment between the auditory scene and the at least one rectilinear scene and in response to the detected spatial congruency being below the threshold, adjusting the spatial congruency. Embodiments in this regard further include a corresponding computer program product.

In another aspect, example embodiments disclosed herein provide a system for adjusting spatial congruency in a video conference. The system includes a video endpoint device configured to capture a visual scene in an omnidirectional manner, an audio endpoint device configured to capture an auditory scene that is positioned in relation to the video endpoint device, an unwarping unit configured to unwarp the captured visual scene into at least one rectilinear scene, a spatial congruency detecting unit configured to detect the spatial congruency between the at least one rectilinear scene and the auditory visual scene, the spatial congruency being a degree of alignment between the auditory scene and the visual scene; and a spatial congruency adjusting unit configured to adjust the spatial congruency in response to the detected spatial congruency being below the threshold.

Through the following description, it would be appreciated that in accordance with example embodiments disclosed herein, the spatial congruency can be adjusted in response to any discrepancy between the auditory scene and the rectilinear scene obtained from an omnidirectional visual scene. The adjusted auditory scene relative to the visual scene or the adjusted visual scene relative to the auditory scene is naturally presented by multiple transducers (including speakers, headphones and the like) and at least one display. The present invention realizes a video conference with a representation of audio in 3D. Other advantages achieved by the example embodiments disclosed herein will become apparent through the following descriptions.

DESCRIPTION OF DRAWINGS

Through the following detailed descriptions with reference to the accompanying drawings, the above and other objectives, features and advantages of the example embodiments will become more comprehensible. In the drawings, several example embodiments will be illustrated in examples and in a non-limiting manner, wherein:

FIG. 1 illustrates a schematic diagram of an audio endpoint device in accordance with an example embodiment;

FIG. 2 illustrates an example coordinate system used for the audio endpoint device as shown in FIG. 1;

FIG. 3 illustrates an omnidirectional visual scene captured by a visual endpoint device in accordance with an example embodiment;

Throughout the drawings, the same or corresponding reference symbols refer to the same or corresponding parts.

DESCRIPTION OF EXAMPLE EMBODIMENTS

Figure 4:
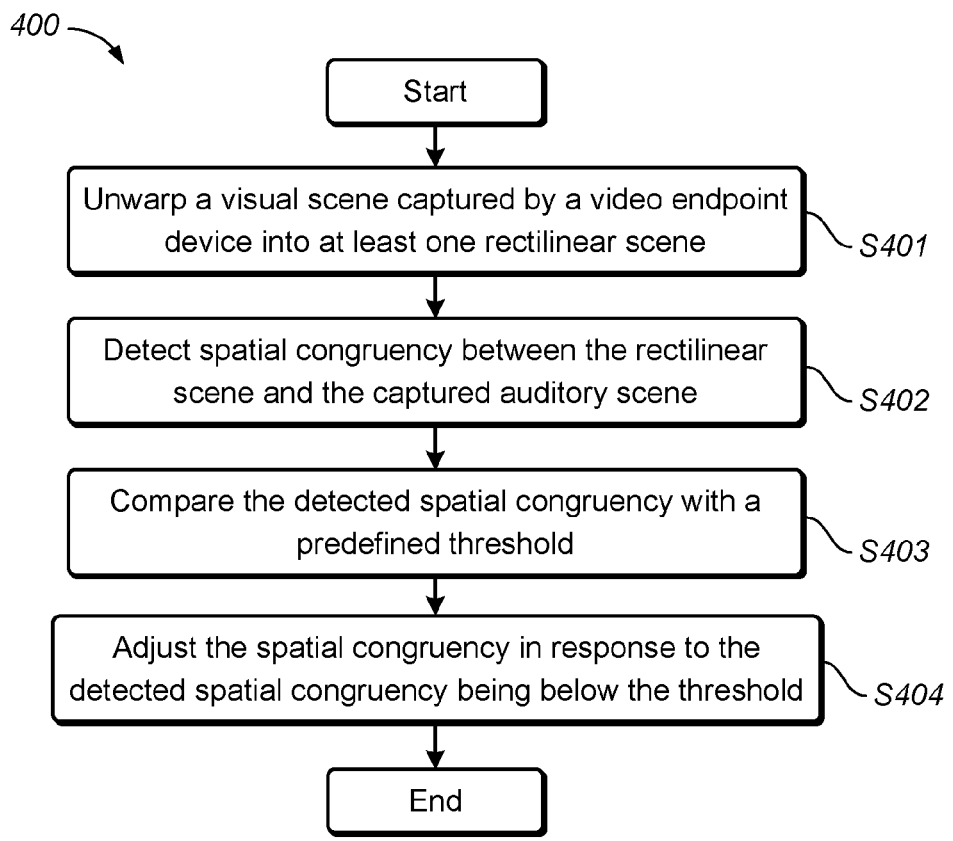
FIG. 4 illustrates a flowchart of a method for adjusting spatial congruency in a video conference in accordance with example embodiments.

Principles of the example embodiments will now be described with reference to various example embodiments illustrated in the drawings. It should be appreciated that the depiction of these embodiments is only to enable those skilled in the art to better understand and further implement the embodiments, not intended for limiting the scope in any manner.

The example embodiments disclosed herein refers to the technologies involved in a video conferencing system. To conduct a video conference with the audio signal represented in 3 dimensions (3D), there must be at least two sides joining the conference establishing a valid conversation. The two sides can be named as a caller side and a callee side. In one embodiment, the caller side includes at least one audio endpoint device and one video endpoint device. The audio endpoint device is adapted to capture an auditory scene, while the video endpoint device is adapted to capture a visual scene. The captured auditory scene and captured visual scene can be transmitted to the callee side, with the captured auditory scene being played by a plurality of transducers and the captured auditory scene being displayed by at least one screen at the callee side. Such transducers can have many forms. For example, they can be constructed as a sound bar placed beneath a major screen, a multi-channel speaker system with many speakers distributed in the callee's room at the callee side, stereo speakers on the corresponding personal computers such as laptops of the participants at the callee side, or headphones or headsets worn on the participants. The display screen can be a large display hung on the wall or a plurality of smaller displays on the personal devices for the participants.

At the callee side, there can be also included an audio endpoint device for capturing the auditory scene and a video endpoint device for capturing the visual scene to be respectively played and viewed at the caller side. However, in this particular embodiment, it is to be noted that an endpoint device at the callee side is optional, and a video conference or conversation can be established once at least one audio endpoint device is provided with at least one video endpoint device at the caller side. In other embodiments, for example, there is not provided any of the endpoint devices at the caller side, but at least one audio endpoint device is provided with at least one video endpoint device at the callee side. Furthermore, the caller side and the callee side can be swapped, depending on who initiates the video conference.

FIG. 1 illustrates a schematic diagram of an audio endpoint device 100 in accordance with an example embodiment. In general, the audio endpoint device 100 contains at least two microphones each for capturing or collecting sound pressure toward it. In one embodiment, as shown in FIG. 1, three cardioid microphones 101, 102 and 103 facing three different directions are provided as a single audio endpoint device 100. Each of the audio endpoint devices 100 according to this particular embodiment has a front direction which is used for facilitating the conversion of the captured audio data. In this particular embodiment as shown in FIG. 1, the front direction shown by an arrow is fixed relative to the three microphones. There can be provided a right microphone 101 pointing to a first direction, a rear microphone 102 pointing to a second direction, and a left microphone 103 pointing to a third direction. In this particular embodiment, the first direction is angled clockwise by approximately 60 degrees with respect to the front direction, the second direction is angled clockwise by approximately 180 degrees with respect to the front direction, and the third direction is angled counterclockwise by approximately 60 degrees with respect to the front direction.

It is to be noted that although there can be more than three microphones in one audio endpoint device, three microphones in most cases can already be used to capture an immersive auditory scene in a space. In a configuration of microphones as illustrated in FIG. 1, the front direction is, for example preset and fixed relative to the microphones for ease of transforming the captured audio signals from the three microphones into "WXY" B-format. For the example for using three microphones 101, 102 and 103 in the audio endpoint device 100 as illustrated by FIG. 1, the audio endpoint device 100 can generate LRS signals by the left microphone 103, the right microphone 101, and the rear microphone 102, where L represents the audio signal captured and generated by the left microphone 103, R represents the audio signal captured and generated by the right microphone 101, and S represents the audio signal captured and generated by the rear microphone 102. In one embodiment, the LRS signals can be transformed to the WXY signals by the following equation:

$$\begin{bmatrix} W \\ X \\ Y \end{bmatrix} = \begin{bmatrix} \frac{2}{3} & \frac{2}{3} & \frac{2}{3} \\ \frac{2}{3} & \frac{2}{3} & -\frac{4}{3} \\ \frac{2}{\sqrt{3}} & -\frac{2}{\sqrt{3}} & 0 \end{bmatrix} \begin{bmatrix} L \\ R \\ S \end{bmatrix} \quad (1)$$

In Equation (1), W represents a total signal weighed equally from all of the three microphones 101, 102 and 103, meaning it can be used as a mono output including no position or direction information within the audio signal, while X and Y represent a position of the audio object along X axis and Y axis respectively in an X-Y coordinate system as shown in FIG. 2. In the example shown in FIG. 2, the X axis is defined by the front direction of the audio endpoint device 100, and the Y axis is angled counterclockwise by 90 degrees with respect to the X axis.

Such a coordinate system can be rotated counterclockwise from the X axis by any angle θ and a new WXY sound field can be obtained by the following equation (2):

$$\begin{bmatrix} W' \\ X' \\ Y' \end{bmatrix} = \begin{bmatrix} 1 & 0 & 0 \\ 0 & \cos(\theta) & -\sin(\theta) \\ 0 & \sin(\theta) & \cos(\theta) \end{bmatrix} \begin{bmatrix} W \\ X \\ Y \end{bmatrix} \quad (2)$$

By using equation (2), the rotation of the audio endpoint device 100 can be compensated.

Continuing to consider the examples where the surround sound field is generated as B-format signals. It would be readily appreciated that once a B-format signal is generated, W, X and Y channels may be converted to various formats suitable for spatial rendering. The decoding and reproduction of Ambisonics are dependent on the loudspeaker system used for spatial rendering. In general, the decoding from an Ambisonics signal to a set of loudspeaker signals is based on the assumption that, if the decoded loudspeaker signals are being played back, a "virtual" Ambisonics signal recorded at the geometric center of the loudspeaker array should be identical to the Ambisonics signal used for decoding. This can be expressed as:

$$C \cdot L = B \quad (3)$$

where $L = \{L_1, L_2, \ldots, L_n\}^T$ represents the set of loudspeaker signals, $B = \{W, X, Y, Z\}^T$ represents the "virtual" Ambisonics signal assumed to be identical to the input Ambisonics signal for decoding, and C is known as a "re-encoding" matrix defined by the geometrical definition of the loudspeaker array (e.g., azimuth, elevation of each loudspeaker). For example, in one example scenario a square loudspeaker array is provided, where loudspeakers are placed horizontally at the azimuth of {45°, −45°, 135°, −135°} and elevation {0°, 0°, 0°, 0°}, this defines C as:

$$C = \begin{bmatrix} 1 & 1 & 1 & 1 \\ \cos(45°) & \cos(-45°) & \cos(135°) & \cos(-135°) \\ \sin(45°) & \sin(-45°) & \sin(135°) & \sin(-135°) \\ 0 & 0 & 0 & 0 \end{bmatrix} \quad (4)$$

Based on this, the loudspeaker signals can be derived as:

$$L = D \cdot B \quad (5)$$

where D represents the decoding matrix typically defined as the pseudo-inverse matrix of C.

In accordance with some embodiments, in binaural rendering, audio is played back through a pair of earphones or headphones. B-format to binaural conversion can be achieved approximately by summing "virtual" loudspeaker array feeds that are each filtered by a head-related transfer functions (HRTF) matching the loudspeaker position. In spatial hearing, a directional sound source travels two distinctive propagation paths to arrive at the left and right ears respectively. This results in the arrival-time and intensity differences between the two ear entrance signals, which are then exploited by the human auditory system to achieve localized hearing. These two propagation paths can be well modeled by a pair of direction-dependent acoustic filters, referred to as the head-related transfer functions. For example, given a sound source S located at direction φ, the ear entrance signals $S_{left}$ and $S_{right}$ can be modeled as:

$$\begin{bmatrix} S_{left} \\ S_{right} \end{bmatrix} = \begin{bmatrix} H_{left,\varphi} \\ H_{right,\varphi} \end{bmatrix} \cdot S^T \quad (6)$$

where $H_{left,\varphi}$ and $H_{right,\varphi}$ represent the HRTFs of direction φ. In practice, the HRTFs of a given direction can be measured by probe microphones inserted in the ears of a subject's (either a person or a dummy head) to pick up responses from an impulse, or a known stimulus, placed in the direction.

These HRTF measurements can be used to synthesize virtual ear entrances signals from a monophonic source. By filtering this source with a pair of HRTFs corresponding to a certain direction and presenting the resulting left and right signals to a listener via headphones or earphones, a sound field with a virtual sound source spatialized in the desired direction can be simulated. Using the four-speaker array described above, we can thus convert the W, X, and Y channels to binaural signals as follows:

$$\begin{bmatrix} S_{left} \\ S_{right} \end{bmatrix} = \begin{bmatrix} H_{left,1} & H_{left,2} & H_{left,3} & H_{left,4} \\ H_{right,1} & H_{right,2} & H_{right,3} & H_{right,4} \end{bmatrix} \cdot \begin{bmatrix} L_1 \\ L_2 \\ L_3 \\ L_4 \end{bmatrix} \quad (7)$$

where $H_{left,n}$ represents the transfer function from the nth loudspeaker to the left ear, and $H_{right,n}$ represents the transfer function from the nth loudspeaker to the right ear. This can be extended to more loudspeakers:

$$\begin{bmatrix} S_{left} \\ S_{right} \end{bmatrix} = \begin{bmatrix} H_{left,1} & H_{left,2} & \ldots & H_{left,n} \\ H_{right,1} & H_{right,2} & \ldots & H_{right,n} \end{bmatrix} \cdot \begin{bmatrix} L_1 \\ L_2 \\ \vdots \\ L_n \end{bmatrix} \quad (8)$$

where n represents the total number of loudspeakers.

It would be appreciated that more complex sound field processing introduced later builds upon the aforementioned decoding method when the sound field is rendered through loudspeaker arrays or headphones.

In one embodiment, a video endpoint device can be an omnidirectional video camera which is capable of capturing an omnidirectional visual scene as can be illustrated by FIG. 3. The video endpoint device can be located in the vicinity of the audio endpoint device. In one particular embodiment, the endpoint device is placed above the audio endpoint device. In general, the video endpoint device according to the example embodiments is fixedly positioned in relation to or directly fixed onto the audio endpoint device, which is advantageous because the relation between the video capture device and audio capture device is known a priori. This eliminates a calibration or alignment process for the purpose of spatial congruency at the beginning of conference establishment. Moreover, any movement (such as rotation) of the devices will not alter the relation between the two devices. As can be seen from FIG. 3, a typical omnidirectional camera may capture a "donut-shaped" image or scene, with a circle of a certain diameter located at the center capturing no image. The omnidirectional camera can be useful to capture a 360° image, meaning all the participants in the space can be captured in one image.

Reference is first made to FIG. 4 which shows a flowchart of a method 400 for adjusting spatial congruency in a video conference in accordance with the example embodiments.

In one embodiment, an audio endpoint device such as the one shown in FIG. 1 is positioned in relation to a video endpoint device. In a typical conference setting at one side, there can be provided a screen hung on a wall and an omnidirectional video camera fixed above or close to the audio endpoint device. Meanwhile, a few participants are seated in front of the screen, with the omnidirectional video camera placed in front of all the participants. Such a typical setting at one side can be captured by the video endpoint device and, as a result, the captured visual scene is illustrated by FIG. 3.

In FIG. 3, there are five participants 301, 302, 303, 304 and 305 seated around a table on which an audio endpoint device is placed. In this particular setting, the video endpoint device 306a is integrally placed above the audio endpoint device 306b, meaning that the video endpoint 306a would move along with the audio endpoint device 306b altogether.

It is to be noted, however, in one example embodiment, the video endpoint device 306a can be positioned in relation to the audio endpoint device 306b in a detachable manner (not shown). In some other embodiment, the video endpoint device 306a may be positioned with a certain distance from the audio endpoint device 306b (not shown). The example embodiment does not intend to limit how the video endpoint device 306a should be fixedly placed relative to the audio endpoint device 306b.

At step S401, the visual scene captured by the video endpoint device is unwarped into at least one rectilinear scene. In practical use, a rectilinear scene is much more intuitive and natural compared with the raw captured image as shown by FIG. 3. Regardless of the number of rectilinear scenes finally generated, it may be useful to assign a nominal original direction of the captured omnidirectional visual scene. As can be seen from FIG. 3, by way of example only, a direction extending from the center of the "donut-shaped" image to the bottom of the image can be assigned as a nominal original direction of the captured visual scene. It is to be noted, however, any direction can be assigned as the nominal original direction, and the step of assigning is for ease of calculation.

Furthermore, the center of the "donut-shaped" image can be assumed to be $(C_x, C_y)$, while $(0,0)$ commonly refers to the upper left corner of a captured omnidirectional visual scene (e.g., the upper left corner of FIG. 3). The "donut-shaped" image consists of an inner circle with its radius being $R_1$ and an outer circle with its radius being $R_2$. Therefore, a height of the unwarped resulting image can be calculated by $H_D = R_2 - R_1$, and the width of the unwarped rectilinear scene can be expressed by:

$$W_D = 2\pi r, R_1 \leq r \leq R_2 \quad (9)$$

It would be understood by person skilled in the art that if the desired width of unwarped scene is $2\pi R_2$, upsampling or interpolation of the original image with radius less than $R_2$ is needed. Similarly, downsampling or decimation of the original image with radius greater than $R_1$ is needed if width $2\pi R_1$ is required. In one embodiment, in order to perform less interpolation for the inner circle (to upsample) and decimation for the outer circle (to downsample), the width is assumed to be:

$$W_D = 2\pi(R_1 + R_2)/2 \quad (10)$$

Figure 5:
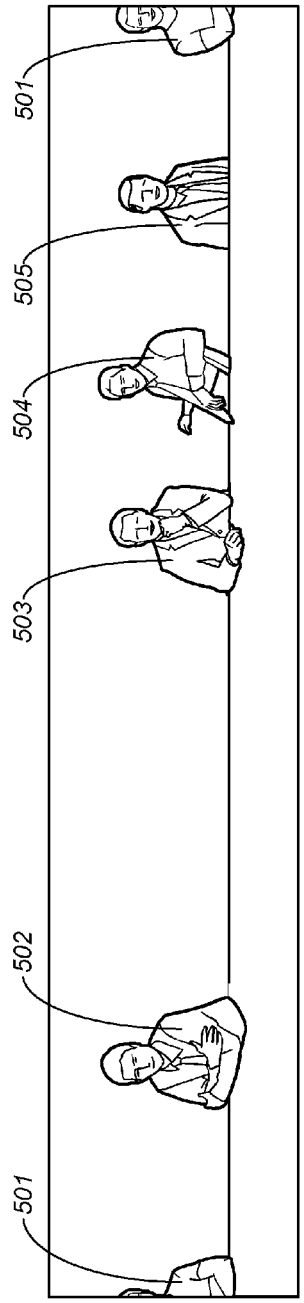
FIG. 5 illustrates a single rectilinear scene unwarped from the captured omnidirectional visual scene in accordance with an example embodiment.

Assuming that $(x, y)$ denotes pixel positions for the unwarped rectilinear scene, and $(x_s, y_s)$ denotes pixels positions for the raw omnidirectional visual scene, where $(0,0)$ refers to the upper left corner of each scene, while x axis is along the nominal original direction as shown in FIG. 3 and y axis is rotated counterclockwise for 90 degrees from the x axis. Therefore, when the "donut-shaped" captured visual scene is unwarped into a single rectilinear scene as shown in FIG. 5, the captured omnidirectional visual scene and the unwarped single rectilinear scene can be mapped by the following equations (11) to (14):

$$r = (y/H_D)(R_2 - R_1) + R_1 \quad (11)$$

$$\theta = 2\pi(x/W_D) \quad (12)$$

$$x_s = C_x + r \cdot \cos(\theta) \quad (13)$$

$$y_s = C_y + r \cdot \sin(\theta) \quad (14)$$

where $\theta$ represents the angle rotated counterclockwise from the nominal original direction in the omnidirectional visual scene, which means that the single rectilinear scene is split from the nominal original direction.

Once the pixel positions for the unwarped single rectilinear scene and for the raw omnidirectional visual scene are mapped, the mapping can be performed by known image processing routines such as a remap method provided by OpenCV and the like.

Additionally, visual scene rotation can be realized by adding an offset angle in equation (12) before performing the unwarping function:

$$\theta = 2\pi(x/W_D) + \theta_0 \quad (15)$$

where $\theta_0$ represents the offset angle value from the nominal original direction.

Rotating the raw circular image corresponds to changing the starting position of the rectilinear scene during unwarping, which would be appreciated later that this could be used for adjusting the video scene to achieve spatial congruency.

Figure 6:
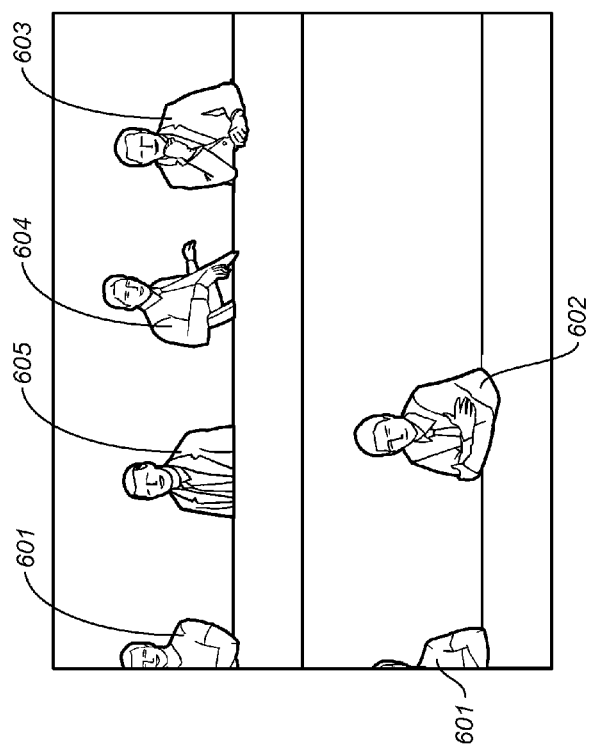
FIG. 6 illustrates two rectilinear scenes unwarped from the captured omnidirectional visual scene in accordance with an example embodiment.

In an alternative embodiment, the captured omnidirectional visual scene can be unwarped into two rectilinear scenes as shown in FIG. 6, each representing 180 degrees of the captured visual scene. This mapping process can be readily achieved by some modifications of equations (12) to (15). An image flip operation during mapping may be needed in order to generate two rectilinear scenes, so that the top scene of FIG. 6 corresponds to the left hemisphere of the captured visual scene of FIG. 3, and the bottom scene of FIG. 6 corresponds to the right hemisphere of the captured visual scene of FIG. 3. This means that the two rectilinear scenes are split from the nominal original direction as shown in FIG. 3 and from an opposite direction with regard to the nominal original direction, and the right end of the unwarped top scene is continuous with the right end of the unwarped bottom scene, while the left end of the unwarped top scene is continuous with the left end of the unwarped bottom scene.

At step S402, the spatial congruency between the rectilinear scene and the captured auditory scene is detected, and this detection is in real time. The spatial congruency can be represented by different indicators. For example, the spatial congruency may be represented by angle. In one example embodiment, the spatial congruency may be represented by distance or percentage, considering the positions of the audio objects or participants can be compared with the rectilinear scene in a space defined by the camera. This particular step S402 can be conducted in real time throughout the video conference session, including the initial detection of the spatial congruency just after initiating the video conference session.

At step S403, the detected spatial congruency is compared with a predefined threshold. This could happen especially when equation (15) is used to operate a rotation of the omnidirectional visual scene so that a split of audio object can be avoided, for example. This scenario can be illustrated by FIGS. 5 and 6, in which the audio objects 501 and 601 are split into two parts. In a particular example that the spatial congruency is represented by an angle as described above, the predefined threshold value can be 10°, meaning that the captured auditory scene is offset by 10° compared with the rectilinear scene. As a result, a discrepancy in the angle greater than 10° would trigger the adjustment of step S404, which will be described in the following.

At step S404, the spatial congruency is adjusted in response to, for example, the discrepancy between the captured auditory scene and the rectilinear scene exceeding a predefined threshold value or the spatial congruency below the threshold as described above. It should be noted that the discrepancy or spatial congruency can be obtained by comparing the auditory scene with either the at least one rectilinear scene or the captured omnidirectional visual scene.

In one embodiment, the audio endpoint device and the video endpoint device are fixedly provided with each other. Any motion of the two devices together can trigger the unwarping process, as well as the detection, comparison, and adjustment of the spatial congruency if the discrepancy surpasses the predefined threshold value.

By using a sensor, such as a gyroscope embedded in either the audio endpoint device or the video endpoint device for detecting the motion, any rotation of the audio endpoint device can be detected instantly, so that a real-time detection of the spatial congruency becomes possible.

Figure 7:
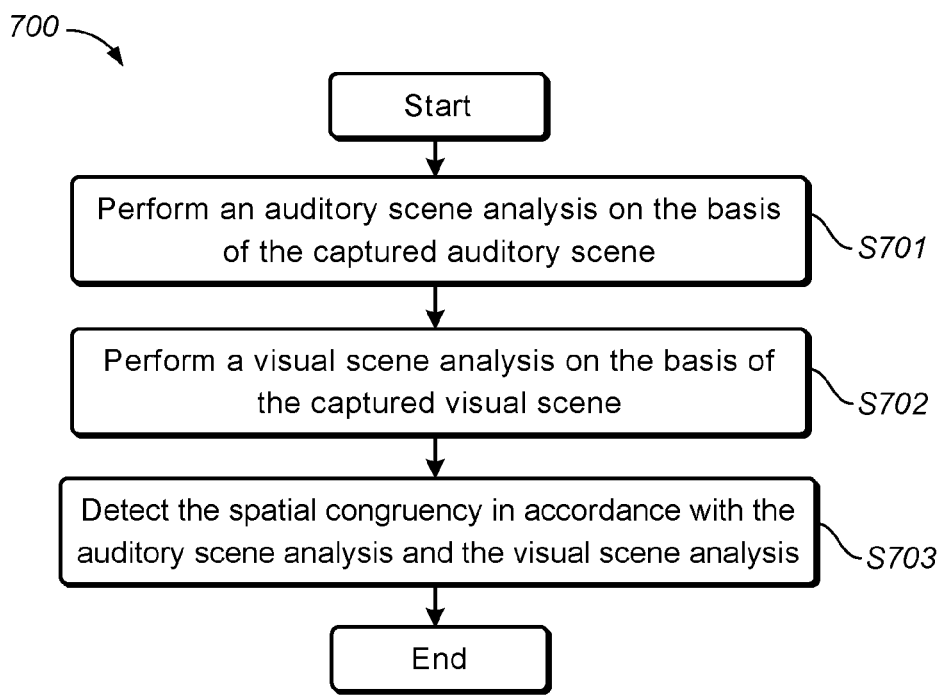
FIG. 7 illustrates a flowchart of a method for detecting the spatial congruency in accordance with example embodiments.

Reference is made to FIG. 7 which shows a flowchart of a method 700 for detecting the spatial congruency in accordance with example embodiments.

In addition to the approach described above which has to utilize some a priori knowledge, for example, orientation information from sensors embedded in either the audio endpoint device or the video endpoint device, a blind approach based on analyzing the captured visual and/or audio scenes can be useful when such information is not available.

At step S701, an auditory scene analysis (ASA) can be performed on the basis of the captured auditory scene in order to identify an auditory distribution of the audio objects, where the auditory distribution is a distribution of the audio objects relative to the audio endpoint device. For example, by reference to FIG. 3, participants 301, 302, 303, 304, 305 and 306 are around the audio endpoint device, and thus constitute an auditory distribution in the space.

In one embodiment, ASA can be realized by several techniques. For example, a directional-of-arrival (DOA) analysis may be performed for each of the audio objects. Some popular and known DOA methods in the art include Generalized Cross Correlation with Phase Transform (GCC-PHAT), Steered Response Power-Phase Transform (SRP-PHAT), Multiple Signal Classification (MUSIC) and the like. Most of the DOA methods known in the art are already apt to analyze the distribution of the audio objects, e.g., participants in a video conference. ASA can also be performed by estimating depth/distance, signal level, and diffusivity of an audio object. The diffusivity of an audio object represents the degree of how reverberant the acoustic signal arriving at the microphone location from a particular source is. Additionally or alternatively, speaker recognition or speaker diarization methods can be used to further improve ASA. A speaker recognition system employs spectral analysis and pattern matching to identify the participant identity against existing speaker models. A speaker diarization system can segment and cluster the history meeting recordings, such that each speech segment is assigned to a participant identity. Additionally or alternatively, conversation analysis can be performed to examine the interactivity patterns among participants, e.g., a conversational interaction between the audio objects. In its simplest form, one or more dominant or key audio objects can be identified by checking the verbosity for each participant. Knowing which participant speaks the most not only helps in aligning audio objects better, but also allows making the best trade-off when a complete spatial congruency cannot be achieved. That is, at least the key audio object may be ensured with a satisfying congruency.

It is to be noted that, most of the known ASA techniques are capable of identifying the auditory distribution of the audio objects, and thus these techniques will not be elaborated in detail herein.

At step S702, a visual scene analysis (VSA) can be performed on the basis of the rectilinear scene in order to identify a visual distribution of the audio objects, where the visual distribution is a distribution of the audio objects relative to the video endpoint device. For example, with reference to FIG. 5, participants 501, 502, 503, 504 and 505 are distributed in a single rectilinear scene and thus constitute a visual distribution relative to the video endpoint device.

In one embodiment, VSA can also be realized by several techniques. Most of the techniques may involve object detection and classification. In this context, video and audio objects as participants, who can speak, are of main concern and are to be detected. For example, by analyzing the captured visual scene, existing face detection/recognition algorithms in the art can be useful to identify the object's position in a space. Additionally, a region of interest (ROI) analysis or other object recognition methods may optionally be used to identify the boundaries of target video objects, for example, shoulders and arms when faces are not readily detectable. Once faces of the participants are found in the captured visual scene, a ROI for the faces can be created and then lip detection can optionally be applied to the faces as lip movement is a useful cue for associating a participant with an audio object and examining if the participant is speaking or not.

It is to be noted that, most of the known VSA techniques are capable of identifying the visual distribution of the audio objects, and thus these techniques will not be elaborated in detail herein.

In one example embodiment, identities of the participants may be recognized, which is useful for matching audio with video signals in order to achieve congruency. At step S703, the spatial congruency may be detected in accordance with the resulting ASA and/or VSA.

Once the spatial congruency is obtained, the adjustment of the spatial congruency at step S404 can be performed. The adjustment of the spatial congruency can include either or both of the auditory scene adjustment and the visual scene adjustment. As described above, if the detected spatial congruency is below a certain threshold (step S403), the adjustment may be triggered. Previous examples use angles in degrees to represent the match or mismatch of the visual scene and the auditory scene. However, more sophisticated representations may also be used to represent a match or a mismatch. For example, a simulated 3D space may be generated to have one or more participants mapped in the space, each having a value corresponding to his/her perceived position in the sound field. Another simulated 3D space can be generated to have the same participants mapped in the space, each having a value corresponding to his/her auditory position. The two generated spaces may be compared to generate the spatial congruency or interpreted in order to facilitate the adjustment of the spatial congruency.

There are several methods that can be used to adjust the spatial congruency. In one embodiment, as described above, equation (2) can be used to rotate the captured auditory scene by any preferred angle. Rotation can be a simple yet effective way to adjust the spatial congruency, for example, in response to the audio endpoint device being rotated. Similarly, the captured auditory scene may be translated with regard to the audio endpoint device, especially when the audio endpoint device is relocated during the video conference session.

In another embodiment, the captured auditory scene may be mirrored with regard to an axis defined by the video endpoint device. Specifically, a sound field mirroring operation can be performed, such that audio objects are reflected with regard to an axis, such as the nominal original direction (θ is the angle between an audio object and the axis used for reflection). The mirroring of the auditory scene can be performed by the following equation (16), which would be appreciated by person skilled in the art as a reflection operation in Euclidean geometry:

$$\begin{bmatrix} W' \\ X' \\ Y' \end{bmatrix} = \begin{bmatrix} 1 & 0 & 0 \\ 0 & \cos(2\theta) & \sin(2\theta) \\ 0 & \sin(2\theta) & -\cos(2\theta) \end{bmatrix} \begin{bmatrix} W \\ X \\ Y \end{bmatrix} \quad (16)$$

The mirroring process may be useful for adjusting the auditory scene when two rectilinear scenes are generated as shown in FIG. 6, in which the bottom scene is flipped as described above. In the case of generating two rectilinear scenes, the auditory scene may be intentionally scaled down or squeezed, because the width of the shown image or scene as illustrated by FIG. 6 is only half of that of the single rectilinear scene as illustrated by FIG. 5.

In view of the above, the captured auditory scene may need to be scaled, relocated, or squeezed to match the captured visual scene. Moving the sound field or the auditory scene consists of a translation operation using the term in Euclidean geometry. Together with scaling or squeezing sound field, an alternation of the B-format decoding process previously described is needed.

Several example techniques are described below: UHJ downmixing, which converts WXY B-format to two-channel stereo signals (the so-called C-format); or squeezing, whereas a full 360 surround sound field is "squeezed" into a smaller sound field. For example, the sound field can be squeezed into a 60° stereo sound field as if the sound field is rendered through a pair of stereo loudspeakers in front of a user, matching the rectilinear scene as illustrated by FIG. 5. Alternatively, a full-frontal headphone virtualization may be utilized, by which a 360° sound field surrounding a user is re-mapped to a closed shape in the vertical plane, for example, a circle or an ellipse, in front of the user.

Achieving spatial congruency is not limited to sound field processing. It would be appreciated that sometimes a visual scene may be adjusted in addition to the auditory scene adjustment for improving the spatial congruency. For example, the visual scene may be rotated, or the rectilinear scene may be processed such as cropping, translating and the like for aligning the captured visual scene with the captured auditory scene.

In one embodiment, the detection of the spatial congruency as described in step S402 may be performed in-situ, meaning that the captured auditory scene and visual scene are co-located and the corresponding signals are generated at the caller side before being sent the signals to the callee side. Alternatively, the spatial congruency may be detected at a server in the transmission between the caller side and the callee side, with only captured auditory data and visual data sent from the caller side. Performing detection at the server would reduce the computing requirements at the caller side.

In one embodiment, the adjustment of the spatial congruency as described in step S404 may be performed at a server in the transmission between the caller side and the callee side. Alternatively, the spatial congruency may be adjusted at the callee side after the transmission is done. Performing adjustment at the server would reduce the computing requirements at the callee side.

When a single rectilinear scene is generated, the generated scene as viewed at the other side would be visually natural, because the audio objects (such as participants 501, 502, 503, 504 and 505 as shown in FIG. 5) are displayed in sequence. This can be adopted when the participants normally sit still around the video endpoint device. However, for example, when a participant moves from the left end of the single rectilinear scene towards left, he/she will gradually appear from the right end of the single rectilinear, which is not preferred for large visual change. In addition, the auditory scene may not be adjusted simultaneously with the movement of the leftmost participant, causing the participant showing at the right end, but his/her voice coming from the leftmost end.

When two rectilinear scenes are generated, the generated scene as viewed at the other side would be of only half size horizontally compared with the single rectilinear mode. In some examples, the right ends of the top scene and the bottom scene are contiguous, while the left ends of the top scene and the bottom scene are also contiguous. In this mode, the movement of the audio objects (such as participants 601, 602, 603, 604 and 605 as shown in FIG. 6) will not jump from one end to the other end, making the audio transition as smooth as possible.

When performing the unwarping of the captured visual scene as well as the adjustment of the spatial congruency, rules can be preset in order to avoid some scenarios or emphasizing some particular objects. By way of example only, one rule can be that any of the participants should not be split or separated into two parts.

Alternatively, there can be more than two rectilinear scenes generated. Also, visual objects such as a whiteboard may be detected and cropped as an individual scene for emphasizing the displaying of contents written on the whiteboard. In an optional example, visual objects will be detected and cropped for generating several independent scenes, each being matched with a portion of the auditory scene with audio objects corresponding to the respected visual object.

Figure 8:
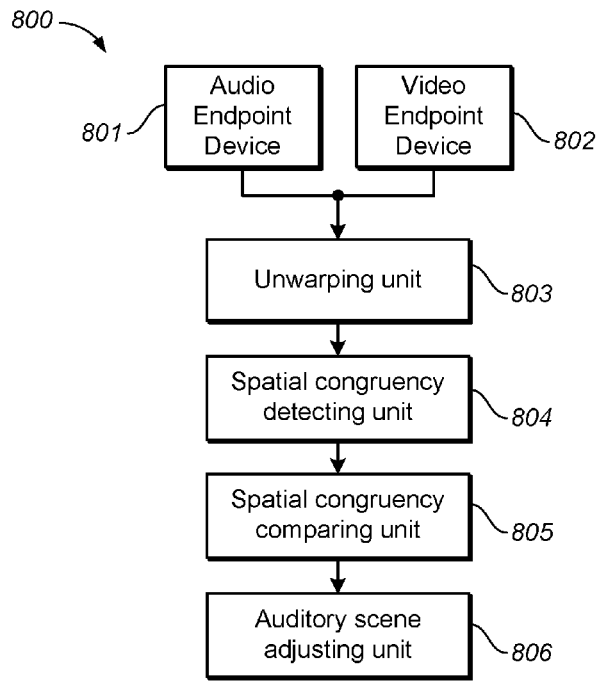
FIG. 8 illustrates a block diagram of a system for adjusting spatial congruency in a video conference in accordance with an example embodiment.

FIG. 8 shows a block diagram of a system 800 for adjusting spatial congruency in a video conference in accordance with one example embodiment as shown. As shown, the system 800 includes an audio endpoint device 801 configured to capture an auditory scene; a video endpoint device 802 configured to capture an visual scene in an omnidirectional manner; an unwarping unit 803 configured to unwarp the captured visual scene into at least one rectilinear scene, a spatial congruency detecting unit 804 configured to detect the spatial congruency between the at least one rectilinear scene and the captured auditory scene, a spatial congruency comparing unit 805 configured to compare the detected spatial congruency with a predefined threshold; and an auditory scene adjusting unit 806 configured to adjust the captured auditory scene based on the detected spatial congruency in response to the detected spatial congruency less than a predefined threshold.

In some embodiments, the unwarping unit 803 may comprise a nominal original direction assigning unit configured to assign a nominal original direction of the captured visual scene; and a splitting unit configured to unwarp the captured visual scene into one rectilinear scene split from the nominal original direction.

In some embodiments, the unwarping unit 803 may comprise a nominal original direction assigning unit configured to assign a nominal original direction of the captured visual scene; and a splitting unit configured to unwarp the captured visual scene into two rectilinear scenes split from the nominal original direction and from an opposite direction with regard to the nominal original direction.

In some embodiments, the spatial congruency detecting unit 804 may include an auditory scene analyzing unit configured to perform an auditory scene analysis on the basis of the captured auditory scene in order to identify an auditory distribution of an audio object, the auditory distribution being a distribution of the audio object relative to the audio endpoint device 801; a visual scene analyzing unit configured to perform a visual scene analysis on the basis of the rectilinear scene in order to identify a visual distribution of the audio object, the visual distribution being a distribution of the audio object relative to the video endpoint device 802 and a spatial congruency detecting unit configured to detect the spatial congruency in accordance with the auditory scene analysis and the visual scene analysis. In these embodiments, the auditory scene analyzing unit may further include at least one of: a DOA analyzing unit configured to analyze a directional of arrival of the audio object, a depth analyzing unit configured to analyze a depth of the audio object, a key object analyzing unit configured to analyze a key audio object and a conversation analyzing unit configured to analyze a conversational interaction between audio objects. In these embodiments, the visual scene analyzing unit may further include at least one of: a face analyzing unit configured to perform a face detection or recognition for the audio object, a region analyzing unit configured to analyze a region of interest for the captured visual scene or the rectilinear scene; and a lip analyzing unit configured to perform a lip detection for the audio object.

In some embodiments, the auditory scene adjusting unit 806 may include at least one of: an auditory scene rotating unit configured to rotate the captured auditory scene, an auditory scene mirroring unit configured to mirror the captured auditory scene with regard to an axis defined by the video endpoint device, an auditory scene translation unit configured to translate the captured auditory scene, an auditory scene scaling unit configured to scale the captured auditory scene and a visual scene rotating unit configured to rotate the captured visual scene.

In some embodiments, the spatial congruency may be detected in-situ or at a server. In some embodiments, the captured auditory scene may be adjusted at a server or at a receiving end of the video conference.

For the sake of clarity, some optional components of the system 800 are not shown in FIG. 8. However, it should be appreciated that the features as described above with reference to FIGS. 1 to 7 are all applicable to the system 800. Moreover, the components of the system 800 may be a hardware module or a software unit module. For example, in some embodiments, the system 800 may be implemented partially or completely with software and/or firmware, for example, implemented as a computer program product embodied in a computer readable medium. Alternatively or additionally, the system 800 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 9:
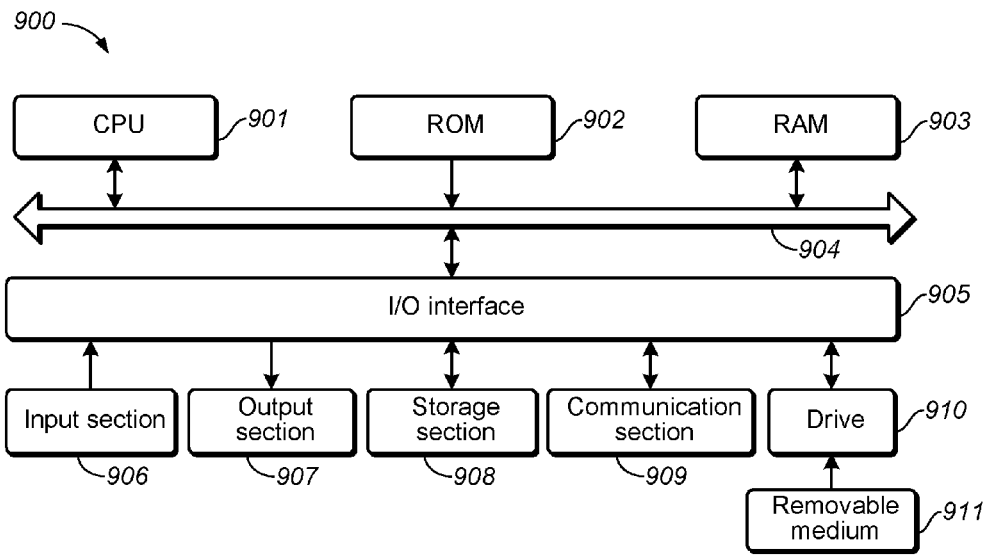
FIG. 9 illustrates a block diagram of an example computer system suitable for the implementing embodiments.

FIG. 9 shows a block diagram of an example computer system 900 suitable for implementing embodiments of the present invention. As shown, the computer system 900 comprises a central processing unit (CPU) 901 which is capable of performing various processes in accordance with a program stored in a read only memory (ROM) 902 or a program loaded from a storage section 908 to a random access memory (RAM) 903. In the RAM 903, data required when the CPU 901 performs the various processes or the like is also stored as required. The CPU 901, the ROM 902 and the RAM 903 are connected to one another via a bus 904. An input/output (I/O) interface 905 is also connected to the bus 904.

The following components are connected to the I/O interface 905: an input section 906 including a keyboard, a mouse, or the like; an output section 907 including a display, such as a cathode ray tube (CRT), a liquid crystal display (LCD), or the like, and a speaker or the like; the storage section 908 including a hard disk or the like; and a communication section 909 including a network interface card such as a LAN card, a modem, or the like. The communication section 909 performs a communication process via the network such as the internet. A drive 910 is also connected to the I/O interface 905 as required. A removable medium 911, such as a magnetic disk, an optical disk, a magneto-optical disk, a semiconductor memory, or the like, is mounted on the drive 910 as required, so that a computer program read therefrom is installed into the storage section 908 as required.

Specifically, in accordance with the embodiments of the present invention, the processes described above with reference to FIGS. 1 to 8 may be implemented as computer software programs. For example, embodiments of the present invention comprise a computer program product including a computer program tangibly embodied on a machine readable medium, the computer program including program code for performing methods 400 and/or 700. In such embodiments, the computer program may be downloaded and mounted from the network via the communication section 909, and/or installed from the removable medium 911.

Generally speaking, various example embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to perform the associated function(s). For example, embodiments of the present invention include a computer program product comprising a computer program tangibly embodied on a machine readable medium, the computer program containing program codes configured to perform the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for performing methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may be executed entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in a sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind of one skilled in the art to which these embodiments of the invention pertain to having the benefit of the teachings presented in the foregoing descriptions and the drawings.

What is claimed is:

1. A method for adjusting spatial congruency in a video conference, the method comprising:
   unwarping a visual scene captured by a video endpoint device into at least one rectilinear scene, the video endpoint device being configured to capture the visual scene in an omnidirectional manner, the unwarping being based on a starting position of the at least one rectilinear scene;
   detecting spatial congruency between the at least one rectilinear scene and an auditory scene captured by an audio endpoint device that is positioned in relation to the video endpoint device, the spatial congruency being a degree of alignment between the auditory scene and the at least one rectilinear scene; and
   in response to the detected spatial congruency being below a predefined threshold, adjusting the spatial congruency by changing the starting position of the at least one rectilinear scene and repeating the unwarping step to create a second at least one rectilinear scene having a spatial congruency greater than the predefined threshold.

2. The method according to claim 1, wherein unwarping the visual scene comprises:
   assigning a nominal original direction of the captured visual scene; and
   unwarping the captured visual scene into one rectilinear scene split from the nominal original direction.

3. The method according to claim 1, wherein unwarping the visual scene comprises:
   assigning a nominal original direction of the captured visual scene; and
   unwarping the captured visual scene into two rectilinear scenes split from the nominal original direction and from an opposite direction with regard to the nominal original direction.

4. The method according to claim 1, wherein detecting the spatial congruency between the rectilinear scene and the captured auditory scene comprises:
   performing an auditory scene analysis on the basis of the captured auditory scene in order to identify an auditory distribution of an audio object, the auditory distribution being a distribution of the audio object relative to the audio endpoint device;
   performing a visual scene analysis on the basis of the rectilinear scene in order to identify a visual distribution of the audio object, the visual distribution being a distribution of the audio object relative to the video endpoint device; and
   detecting the spatial congruency in accordance with the auditory scene analysis and the visual scene analysis.

5. The method according to claim 4, wherein performing the auditory scene analysis comprises at least one of:
   analyzing a directional of arrival of the audio object;
   analyzing a depth of the audio object;
   analyzing a key audio object; and analyzing a conversational interaction between the audio objects.

6. The method according to claim 4, wherein performing the visual scene analysis comprises at least one of:
performing a face detection or recognition for the audio object;
analyzing a region of interest for the captured visual scene or the rectilinear scene; and
performing a lip detection for the audio object.

7. The method according to claim 1, wherein adjusting the spatial congruency further comprises at least one of:
rotating the captured auditory scene;
translating the captured auditory scene with regard to the audio endpoint device;
mirroring the captured auditory scene with regard to an axis defined by the video endpoint device;
scaling the captured auditory scene; and
rotating the captured visual scene.

8. The method according to claim 1, wherein the spatial congruency is detected in-situ or at a server.

9. The method according to claim 1, wherein the spatial congruency is adjusted at a server or at a receiving end of the video conference.

10. A system for adjusting spatial congruency in a video conference, the system comprising:
a video endpoint device configured to capture a visual scene in an omnidirectional manner;
an audio endpoint device configured to capture an auditory scene that is positioned in relation to the video endpoint device;
an unwarping unit configured to unwarp the captured visual scene into at least one rectilinear scene, the unwarping being based on a starting position of the at least one rectilinear scene;
a spatial congruency detecting unit configured to detect the spatial congruency between the at least one rectilinear scene and the captured auditory scene, the spatial congruency being a degree of alignment between the auditory scene and the visual scene;
a spatial congruency adjusting unit configured to adjust the spatial congruency in response to the detected spatial congruency being below a predefined threshold by changing the starting position of the at least one rectilinear scene and repeating the unwarping step to create a second at least one rectilinear scene having a spatial congruency greater than the predefined threshold.

11. The system according to claim 10, wherein the unwarping unit comprises:
a nominal original direction assigning unit configured to assign a nominal original direction of the captured visual scene; and
a splitting unit configured to unwarp the captured visual scene into one rectilinear scene split from the nominal original direction.

12. The system according to claim 10, wherein the unwarping unit comprises:
a nominal original direction assigning unit configured to assign a nominal original direction of the captured visual scene; and
a splitting unit configured to unwarp the captured visual scene into two rectilinear scenes split from the nominal original direction and from an opposite direction with regard to the nominal original direction.

13. The system according to claim 10, wherein the spatial congruency detecting unit comprises:
an auditory scene analyzing unit configured to perform an auditory scene analysis on the basis of the captured auditory scene in order to identify an auditory distribution of an audio object, the auditory distribution being a distribution of the audio object relative to the audio endpoint device; and
a visual scene analyzing unit configured to perform a visual scene analysis on the basis of the rectilinear scene in order to identify a visual distribution of the audio object, the visual distribution being a distribution of the audio object relative to the video endpoint device,
wherein the spatial congruency detecting unit is configured to detect the spatial congruency in accordance with the auditory scene analysis and the visual scene analysis.

14. The system according to claim 13, wherein the auditory scene analyzing unit comprises at least one of:
a directional of arrival analyzing unit configured to analyze a directional of arrival of the audio object;
a depth analyzing unit configured to analyze a depth of the audio object;
a key object analyzing unit configured to analyze a key audio object; and
a conversation analyzing unit configured to analyze a conversational interaction between the audio objects.

15. The system according to claim 13, wherein the visual scene analyzing unit comprises at least one of:
a face analyzing unit configured to perform a face detection or recognition for the audio object;
a region analyzing unit configured to analyze a region of interest for the captured visual scene or the rectilinear scene; and
a lip analyzing unit configured to perform a lip detection for the audio object.

16. The system according to claim 10, wherein the spatial congruency adjusting unit comprises at least one of:
an auditory scene rotating unit configured to rotate the captured auditory scene;
an auditory scene translating unit configured to translate the captured auditory scene with regard to the audio endpoint device;
an auditory scene mirroring unit configured to mirror the captured auditory scene with regard to an axis defined by the video endpoint device;
an auditory scene scaling unit configured to scale the captured auditory scene; and
a visual scene rotating unit configured to rotate the captured visual scene.

17. The system according to claim 10, wherein the spatial congruency is detected in-situ or at a server.

18. The system according to claim 10, wherein the spatial congruency is adjusted at a server or at a receiving end of the video conference.

19. A computer program product for adjusting spatial congruency in a video conference, the computer program product being tangibly stored on a non-transient computer-readable medium and comprising machine executable instructions which, when executed, cause a machine to perform steps of the method according to claim 10.

* * * * *